US010829080B2

(12) United States Patent
Taguchi et al.

(10) Patent No.: US 10,829,080 B2
(45) Date of Patent: Nov. 10, 2020

(54) AIR BAG DEVICE (71) Applicant: AUTOLIV DEVELOPMENT AB, Vargarda (SE)

(72) Inventors: Hiroyuki Taguchi, Yokohama (JP); Yutaka Nakajima, Yokohama (JP); Hideho Fukuda, Yokohama (JP); Mitsuo Nogami, Yokohama (JP); Yuto Kobayashi, Yokohama (JP); Makoto Fuma, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 25 days.

(21) Appl. No.: 15/560,438

(22) PCT Filed: Jan. 29, 2016

(86) PCT No.: PCT/JP2016/052617
§ 371 (c)(1),
(2) Date: Sep. 21, 2017

(87) PCT Pub. No.: WO2016/152245
PCT Pub. Date: Sep. 29, 2016

(65) Prior Publication Data
US 2018/0065591 A1    Mar. 8, 2018

(30) Foreign Application Priority Data
Mar. 23, 2015  (JP) .................. 2015-059193

(51) Int. Cl.
*B60R 21/207*   (2006.01)
*B60R 21/233*   (2006.01)
(Continued)

(52) U.S. Cl.
CPC ...... *B60R 21/23138* (2013.01); *B60R 21/207* (2013.01); *B60R 21/233* (2013.01);
(Continued)

(58) Field of Classification Search
CPC ............ B60R 21/23138; B60R 21/207; B60R 21/233; B60R 21/239; B60R 2021/23146; B60R 2021/23316
(Continued)

(56) References Cited

U.S. PATENT DOCUMENTS 6,976,702 B2 * 12/2005 Yokota .............. B60R 21/23138
280/729
2004/0130127 A1 * 7/2004 Kurimoto ......... B60R 21/23138
280/729
(Continued)

FOREIGN PATENT DOCUMENTS

CN    103402824 A    11/2013
EP    2 752 388 A     7/2014
(Continued)

OTHER PUBLICATIONS

International Search Report of PCT/JP2016/052617, dated Apr. 19, 2016.

*Primary Examiner* — Keith J Frisby
(74) *Attorney, Agent, or Firm* — Dickinson Wright PLLC (57) ABSTRACT A side airbag apparatus which allows a reduced amount of base fabric and, enables gas to flow efficiently inside the cushion. An inflator (110) supplies gas, a cushion (104) in which base fabrics are formed into a bag shape and inflates and deploys to protect an occupant (118) during a vehicle emergency, a base fabric joint portion (120) which is provided to join main panels 108*a* and 108*b* of the cushion (104) in a linear manner and partitions the cushion (104) into a rear chamber (114), a front chamber (116), and an opening (123) provided midway along the base fabric joint portion (120). The base fabric joint portion (120) includes vent forming portions 125*a* and 125*b* arranged in two rows which extend from both ends of the opening (123) towards the front chamber (116) or rear chamber (114) and form a projecting (Continued)

vent (124). The projecting vent (124) permits flow of gas between the rear chamber (114) and the front chamber (116).

9 Claims, 6 Drawing Sheets

(51) Int. Cl.
 *B60R 21/239* (2006.01)
 *B60R 21/231* (2011.01)
(52) U.S. Cl.
 CPC .. *B60R 21/239* (2013.01); *B60R 2021/23146* (2013.01); *B60R 2021/23316* (2013.01)
(58) Field of Classification Search
 USPC .............................................. 280/730.2, 729
 See application file for complete search history.

(56) References Cited

U.S. PATENT DOCUMENTS

| | | | |
|---|---|---|---|
| 2009/0212542 A1* | 8/2009 | Toda | B60R 21/207 280/730.2 |
| 2014/0159355 A1 | 6/2014 | Fujiwara | |
| 2016/0167616 A1* | 6/2016 | Wiik | B60R 21/207 280/729 |

FOREIGN PATENT DOCUMENTS

| | | |
|---|---|---|
| JP | 2008-030596 A * | 2/2008 |
| JP | 2008-120106 A | 5/2008 |
| JP | 2008-201175 A | 9/2008 |
| JP | 2014-046752 A | 3/2014 |
| JP | 2014-162390 A | 9/2014 |
| WO | WO 2013/031009 A1 | 3/2013 |

* cited by examiner

AIR BAG DEVICE

CROSS-REFERENCE TO RELATED APPLICATIONS

This application is a 35 U.S.C. § 371 national phase application of International Application No.: PCT/JP2016/052617, filed Jan. 29, 2016, which claims the benefit of priority under 35 U.S.C. § 119 to Japanese Patent Application No.: 2015-059193, filed Mar. 23, 2015, the contents of which are incorporated herein by reference in their entirety.

FIELD OF THE INVENTION

The present invention relates to an airbag apparatus for restraining an occupant in a vehicle seat when, for example, an impact occurs in a vehicle.

BACKGROUND

Airbags are almost a standard fixture in motor vehicles of recent years. An airbag is a safety apparatus that operates during an emergency such as a vehicle collision, and inflates and deploys due to gas pressure so as to catch and thereby protect an occupant. There are various types of airbags, which vary according to installation location and application. For example, in order to protect a driver from a collision from a front-rear direction, a front airbag apparatus is provided in the center of a steering wheel. Further, in order to protect an occupant from an impact from a vehicle width direction due to a side surface collision or the like, a side curtain airbag apparatus is provided in the vicinity of a ceiling above a side window, a side airbag apparatus is provided in a side portion of a seat, and so on.

In many cases, the interior of a cushion is, in various airbag apparatuses, partitioned into a plurality of regions in consideration to the behaviour, occupant restraining force, and the like thereof during deployment. For example, the side airbag apparatus described in Japanese Publication No.: 2008-201175 has a double structure in which an inner bag is provided inside an outer bag. In accordance with the above-mentioned reference, the inner bag inflates to a high pressure so as to restrain a shoulder vicinity of an occupant, and the outer bag inflates to a low pressure so as to restrain a chest vicinity of the occupant.

With a configuration in which the interior of a cushion is partitioned by providing an inner bag as in the above-mentioned reference, an amount used of fabric (base fabric) constituting the cushion increases. As the amount of base fabric used affects material costs when the cushion is mass produced, it is more effective to decrease the amount of base fabric used to as little as possible. Further, in order to enable rapid inflation and deployment, it is necessary to realise a smooth flow of gas inside the cushion.

In view of such problems, an object of the present invention is to provide an airbag apparatus which allows an amount of base fabric used for a cushion to be reduced and, further, enables gas to flow efficiently inside the cushion.

SUMMARY

In order to solve the problem described above, an airbag apparatus according to the present invention has a representative structure that includes an inflator which supplies gas, a cushion in which base fabric including at least a vehicle outer side panel and a vehicle inner side panel is formed into a bag shape, and which inflates and deploys due to the gas so as to protect an occupant during a vehicle emergency, a base fabric joint portion at which the vehicle outer side panel and the vehicle inner side panel of the cushion are not joined, and which partitions the cushion into at least two chambers, and an opening which is provided midway along the base fabric joint portion and at which the base fabrics are not joined. The base fabric joint portion includes vent forming portions arranged in two rows which extend together from both ends of the opening towards a side of a first chamber of the two chambers and form a projecting vent that projects from the opening into the first chamber, and the projecting vent inflates and deploys during operation of the inflator so as to flow the gas between the two chambers.

With the configuration described above, the interior of the cushion is partitioned by simply joining the base fabrics, hence there is no increase in the amount of base fabric used and material costs can be reduced. Further, by realising a projecting vent using vent forming portions arranged in two rows at which the base fabrics are joined, a smooth flow of gas can be achieved using a simple configuration. It may also be provided that that a vent portion could also be formed by, for example, simply providing an opening (an unsewn portion) midway along a boundary between the two chambers. However, depending on the way in which a force that acts on the base fabrics during inflation and deployment of the cushion is applied, it may be difficult for a force that acts in a direction so as to open the opening to be applied, such that a delay in gas flow could feasibly occur. However, with the projecting vent described above, a force acts on an inner side thereof as gas enters, hence, once gas has entered, the projecting vent does not close or collapse. Accordingly, the configuration described above enables a smooth flow of gas, whereby rapid inflation and deployment and occupant restraint can be achieved.

The projecting vent described above may also include a cylindrical portion in which the vent forming portions arranged in two rows extend towards a first chamber in parallel with each other. This configuration enables suitable realization of a projecting vent that extends in a manner such that a diameter thereof is consistent.

The projecting vent described above may also include a first conical tube portion in which the vent forming portions arranged in two rows extend towards the first chamber while gradually separating from each other. This configuration enables realization of a projecting vent that has a shape in which a diameter thereof gradually increases.

The projecting vent described above may also include a second conical tube portion in which the vent forming portions arranged in two rows extend towards the first chamber while gradually approaching closer to each other. This configuration enables realization of a projecting vent that has a shape in which a diameter thereof gradually decreases.

The base fabric joint portion described above may also further include circular joint portions which close, in a circular shape, the respective ends of the vent forming portions arranged in two rows, and the projecting vent may also be formed by the vent forming portions arranged in two rows and the circular joint portions. As a load may be concentrated in the vicinity of the ends of the vent forming portions, the load is dispersed by providing the circular joint portions, whereby breakage, etc., of the base fabrics can be prevented.

The cushion described above may also be configured such that the cushion described above is for a side airbag which inflates and deploys at a side of an occupant in a vehicle seat, a second chamber of the two chambers is a rear chamber that houses the inflator and the first chamber is a front chamber that inflates and deploys at least towards the vehicle front side of the rear chamber, and the projecting vent extends from the opening to the interior of the front chamber. This configuration allows gas to flow smoothly from the rear chamber to the front chamber, enabling rapid inflation and deployment thereof.

The cushion described above may also be configured such that the cushion described above is for a side airbag which inflates and deploys at a side of an occupant in a vehicle seat, the first chamber is a rear chamber that houses the inflator and the second chamber of the two chambers is a front chamber that inflates and deploys at least towards the vehicle front side of the rear chamber, and the projecting vent extends from the opening to the interior of the rear chamber. This configuration also allows gas to flow smoothly from the rear chamber to the front chamber, enabling rapid inflation and deployment thereof.

Inflation and deployment of the front chamber described above may also be completed later than inflation and deployment of the rear chamber. When the airbag apparatus is used as a side airbag, initially, the rear chamber located immediately beside the occupant is filled with gas in an efficient manner, after which the front chamber, which inflates and deploys over a wide area towards the front of the vehicle, is filled with gas. This configuration allows the cushion to be inflated and deployed rapidly while demonstrating more stable deployment behaviour, enabling early-stage restraint of the occupant to be achieved.

With the present invention, an airbag apparatus can be provided which allows an amount of base fabric used for a cushion to be suppressed and, further, enables gas to flow efficiently inside the cushion.

BRIEF DESCRIPTION OF THE DRAWINGS

FIGS. 1(*a*) and 1(*b*) are diagrams illustrating a side airbag apparatus according to a first embodiment of the present invention.

FIGS. 3(*a*), 3(*b*), and 3(*c*) are diagrams illustrating a process of inflation and deployment of the cushion shown in FIG. 2(*a*).

FIGS. 4(*a*), 4(*b*), 4(*c*), and 4(*d*) are diagrams comparing the cushion shown in FIG. 3(*c*) and a cushion according to a comparative example.

FIGS. 5(*a*) and 5(*b*) are diagrams illustrating a modified example of the cushion shown in FIG. 3(*c*).

FIGS. 6(*a*) and 6(*b*) are diagrams illustrating a modified example of the cushion shown in FIG. 3(*c*).

DETAILED DESCRIPTION

Preferred embodiments of the present invention will be described hereinafter in detail with reference to the accompanying drawings. Dimensions, materials, other specific numerical values, and the like disclosed in the embodiments are merely examples to facilitate understanding of the invention and, unless indicated otherwise, do not limit the present invention. Note that, in this description and in the drawings, elements which have a substantially similar function or configuration will be denoted by identical reference numerals, thereby eliminating redundant explanations, and elements that are not directly related to the present invention will be omitted.

Figure 1:
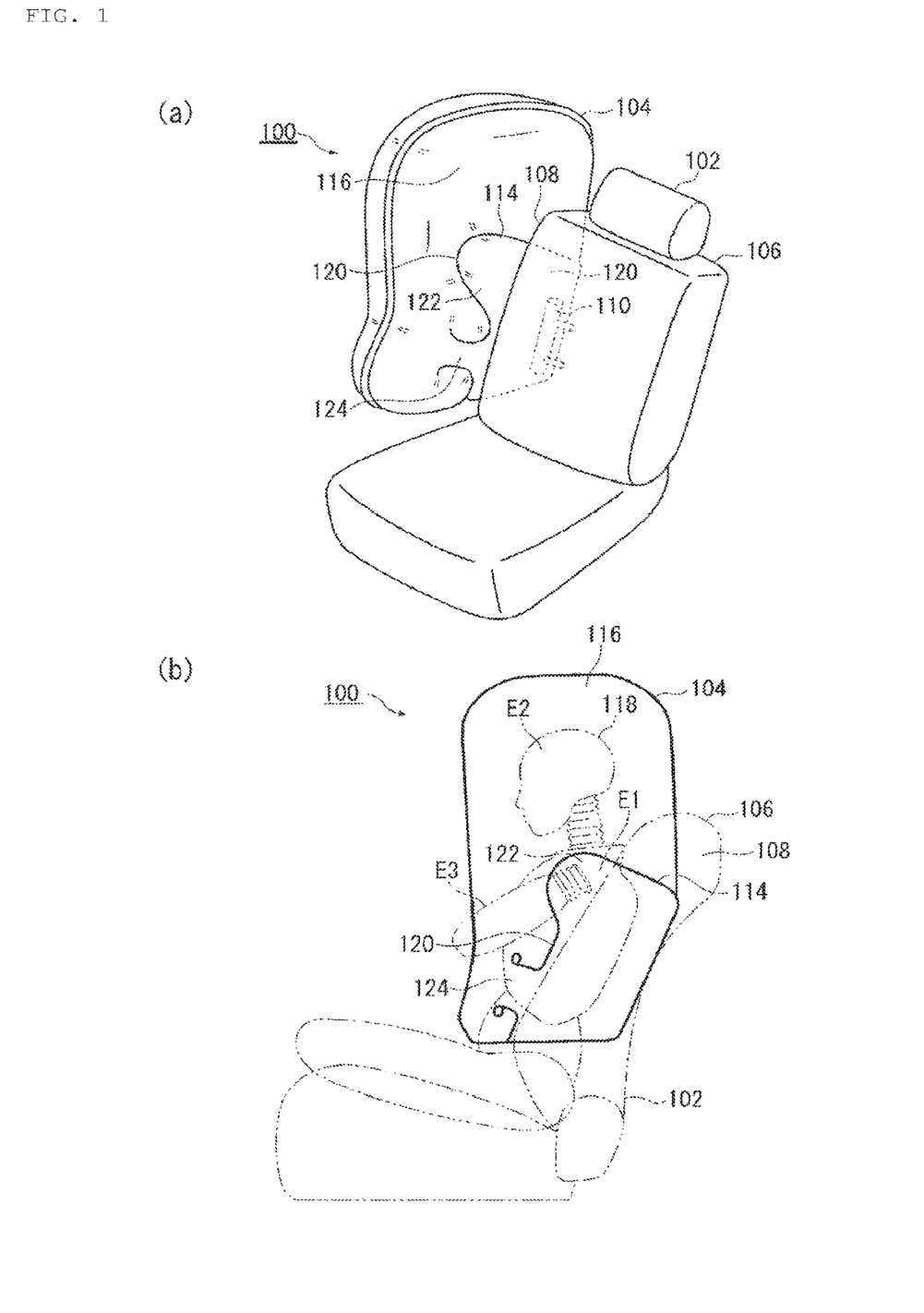

FIGS. 1(*a*) and 1(*b*) are diagrams illustrating a side airbag apparatus 100 according to a first embodiment of the present invention. In FIG. 1(*a*), the side airbag apparatus 100 and a vehicle right side seat 102 to which the side airbag apparatus 100 is applied are illustrated from an inner side thereof in a vehicle width direction. As illustrated in FIGS. 1(*a*) and 1(*b*), in the side airbag apparatus 100, a cushion 104 is configured to inflate and deploy at a side of the seat 102.

The cushion 104 is a bag-shaped part that restrains an occupant during an emergency such as when an impact occurs in the vehicle, and inflates and deploys in a flat shape between the occupant and a side door. The cushion 104 is formed in a bag shape by sewing or adhering together a plurality of base fabric pieces that have been layered one on top of the other. In the present embodiment, the cushion 104 is realised by using a vehicle outer side main panel 108*a* (see FIG. 2) and a vehicle inner side main panel 108*b* as base fabrics, and sewing these base fabrics together in a bag shape. The cushion 104 is rolled or folded so as to be housed in a housing (not shown) provided in a side portion of a seat back 106. The housed-state cushion 104 is invisible from the outside due to being covered by a seat cover or the like from above. During operation of the side airbag 100, the cushion 104 rips open the seat cover or the like and inflates and deploys towards the side of the occupant so as to restrain the occupant from the side.

An inflator 110 is installed together with the cushion 104 in the side portion of the seat back 106. The inflator 110 is a gas generating device, which receives an operation signal transmitted from a vehicle controller when an impact occurs and supplies gas to the interior of the cushion 104. The inflator 110 adopted in the present embodiment is of a cylinder type (cylindrical type), and is enclosed and installed in the cushion 104 so that a longitudinal direction thereof is vertically oriented. A stud bolt (not shown) integrated with the surface of the inflator 110 is exposed from the interior of the cushion 104 to the outside thereof and fastened to the housing provided in the side portion of the seat back 106 or the like.

Inflators popular at present include a type that is filled with a gas generating agent and generates gas by causing combustion thereof, a type which is filled with compressed gas and supplies the gas without generating heat, a hybrid type which uses both combustive gas and compressed gas, and so on. Any of these types of inflator can be used as the inflator 110.

FIG. 1(*b*) is a diagram illustrating the cushion 104 shown in FIG. 1(*a*) as observed from an inner side thereof in the vehicle width direction. FIG. 1(*b*) illustrates a dummy which represents an occupant 118. The interior of the cushion 104 of the present embodiment is partitioned into two chambers. As illustrated in FIG. 1(*a*), in the cushion 104, a rear chamber 114 is provided in a lower area on a vehicle rear side as a first chamber, and a front chamber 116 is provided on a vehicle front side and a vehicle upper side of the rear chamber 114 as a second chamber. The inflator 110 is enclosed and installed in the rear chamber 114.

The rear chamber 114 inflates and deploys mainly in the immediate vicinity of a shoulder E1, a chest, and the like of the occupant 118 so as to restrain the shoulder E1, the chest, and the like of the occupant 118. An intermediate restraining member 122 which has a shape that curves and projects towards the front of the vehicle is provided at the top of the rear chamber 114. The intermediate restraining member 122 is capable of efficiently restraining the vicinity of the shoulder E1 of the occupant 118.

The front chamber 116 has a larger gas capacity than the rear chamber 114 and inflates and deploys widely from the rear chamber 114 towards the front of the vehicle and the top of the vehicle. The front chamber 116 is positioned to restrain the head E2, the arm E3, and so on of the occupant 118 so as to achieve secure protection of the occupant 118.

Figure 2:
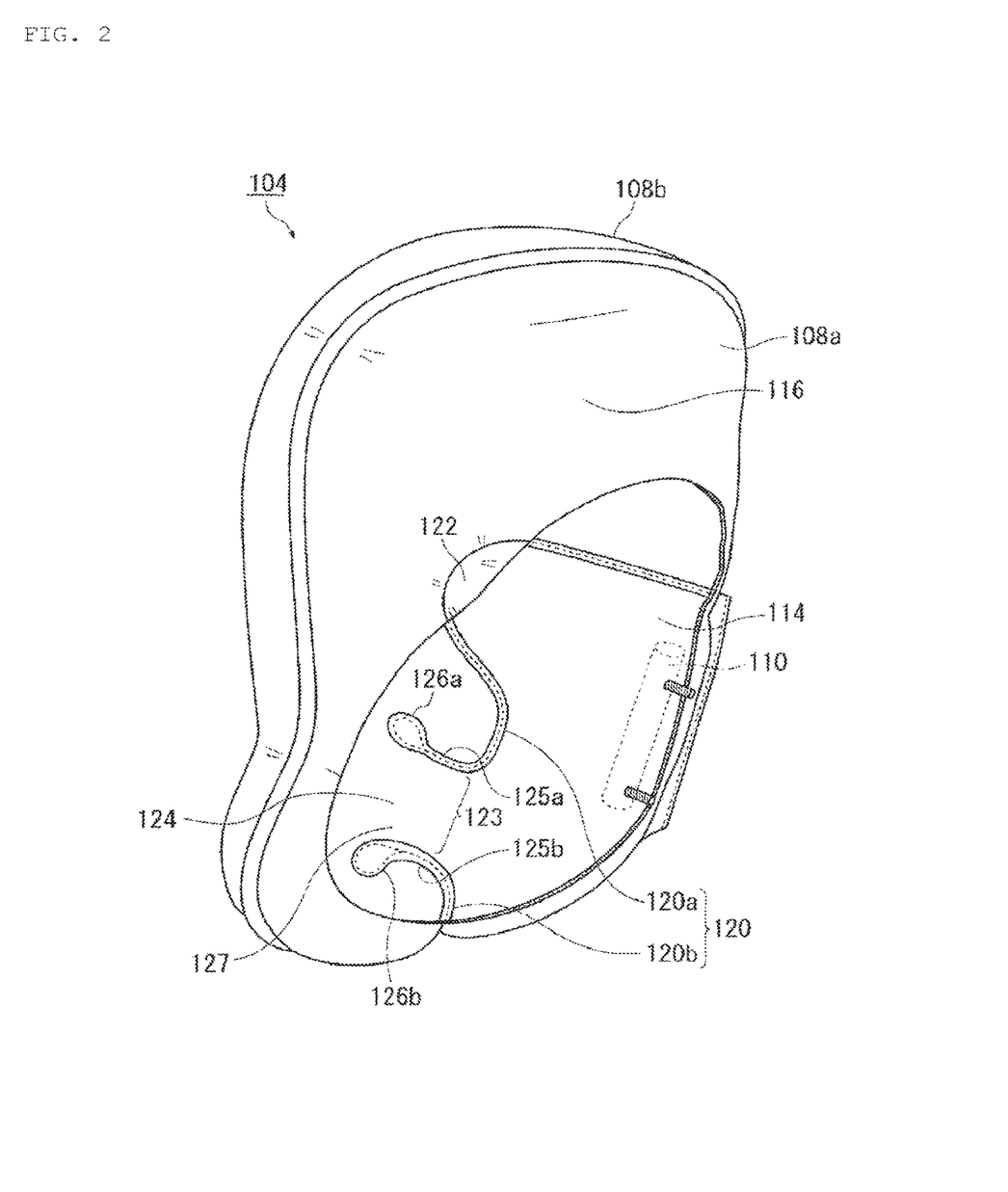
FIG. 2 is a perspective view illustrating the cushion shown in FIGS. 1(*a*) and 1(*b*).

FIG. 2 is a perspective view illustrating the cushion 104 shown in FIGS. 1(a) and 1(b). In FIG. 2, a portion of the vehicle inner side main panel 108a of the vehicle inner side main panel 108a and the vehicle outer side main panel 108b which constitute the surface of the cushion 104 has been omitted in order to illustrate an internal configuration. As illustrated in FIG. 2, the cushion 104 is provided with a base fabric joint portion 120 which partitions the internal space thereof into two chambers, i.e. the rear chamber 114 and the front chamber 116.

The base fabric joint portion 120 joins the main panel 108a and the main panel 108b in a linear manner by sewing and welding or bonding, preventing the gas from passing this therethrough. Most of the base fabric joint portion 120 is provided along a boundary between the rear chamber 114 and the front chamber 116. The base fabric joint portion 120 includes an upper joint portion 120a which is located on an upper side with respect to a projecting vent 124, which will be described later, and a lower joint portion 120b which is located on a lower side with respect to the projecting vent 124. As an alternative method of partitioning the cushion 104, there also exists a method of partitioning by means of a part called a baffle, which is provided by using, for example, base fabric. However, in comparison to this method, the interior of the cushion 104 of the present embodiment is partitioned using only the base fabric joint portion 120, hence there is no increase in the amount of materials such as base fabric used and material costs can be suppressed.

Gas is supplied from the rear chamber 114 to the front chamber 116 through the projecting vent 124. The projecting vent 124 projects so as to extend from the rear chamber 114, i.e. the second chamber of the two chambers to the interior of the front chamber 116, i.e. the first chamber of the two chambers and inflates and deploys in a cylindrical shape so as to allow gas to flow between the two chambers. The projecting vent 124 is provided by means of an opening 123 which is provided between the upper joint portion 120a and the lower joint portion 120b, and two vent forming portions 125a and 125b, which extend together from both ends of the opening 123 towards a side of the front chamber 116 as portions of the base fabric joint portion.

The opening 123 is an area in which the base fabrics are not joined, and is provided midway along the base fabric joint portion 120 which forms the boundary between the rear chamber 114 and the front chamber 116. The vent forming portions 125a and 125b are portions arranged in two rows, i.e. an upper row and a lower row, which form the projecting vent 124 in the base fabric joint portion 120, and include the vent forming portion 125a on an upper side of the opening 123 and the vent forming portion 125b on a lower side of the opening 123. With such a configuration, the projecting vent 124, which extends from the opening 123 to the interior of the front chamber 116, is formed when the cushion 104 inflates and deploys. The vent forming portions 125a and 125b, which are arranged in two rows, extend towards the front chamber 116 side in parallel with each other and form a cylindrical portion 127 in the projecting vent 124. The cylindrical portion 127 is a part that extends in a manner such that a diameter thereof is consistent, and occupies the main portion of the projecting vent 124 of the present embodiment.

Circular joint portions 126a and 126b are provided at respective ends of the vent forming portions 125a and 125b. The circular joint portions 126a and 126b close the respective ends of the vent forming portions 125a and 125b in a circular or rounded shape. Although there is a tendency for a load to be concentrated in the vicinity of the ends of the vent forming portions 125a and 125b, the load can be dispersed by providing the circular joint portions 126a and 126b, whereby breakage (bursting) and the like of the base fabrics is prevented.

Figure 3:
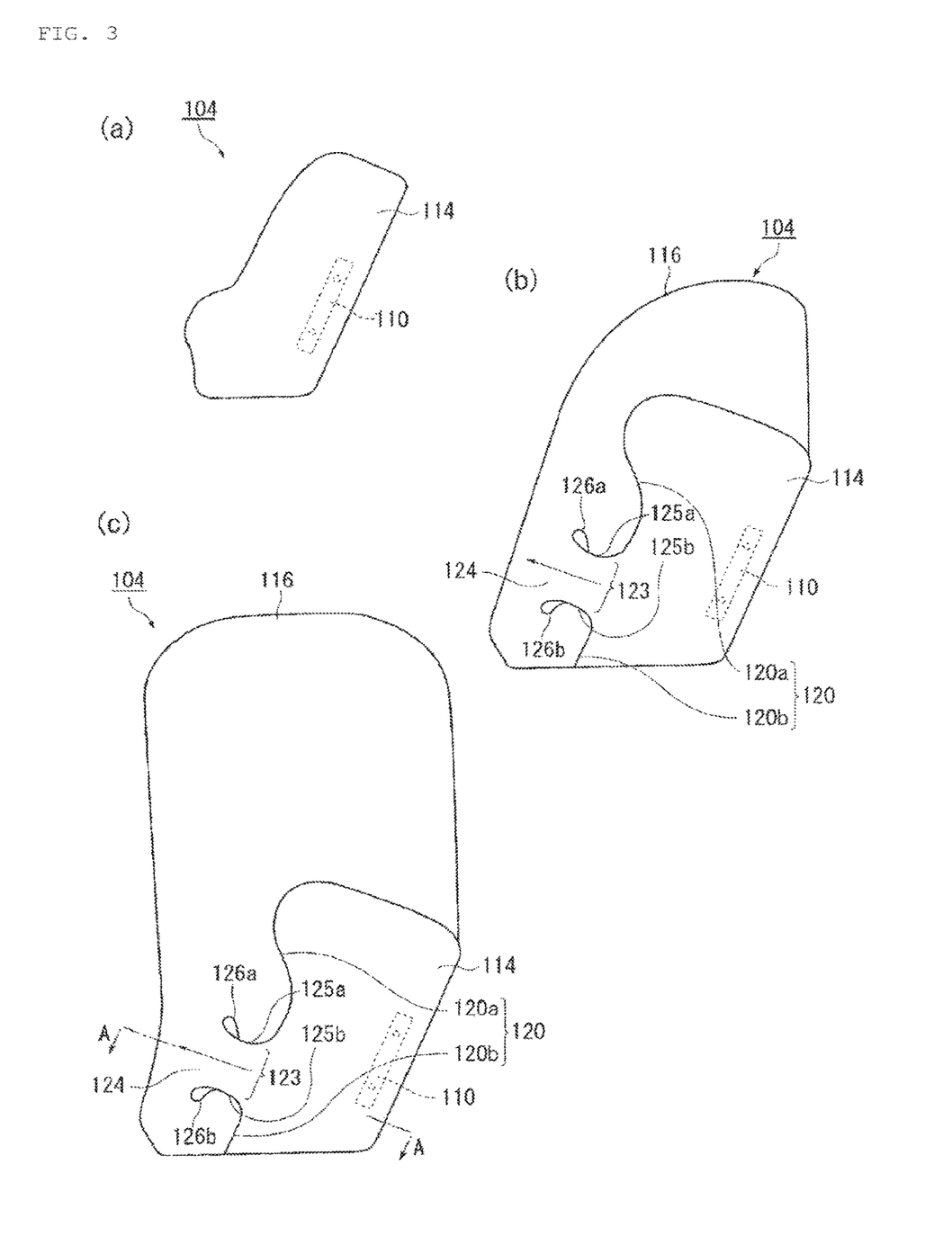

FIGS. 3(a) to 3(c) are diagrams illustrating a process of inflation and deployment of the cushion 104 shown in FIG. 2(a). As illustrated in FIG. 3(a), when the inflator 110 operates, initially, the rear chamber 114 begins to inflate and deploy. FIG. 3(b) illustrates a state in which further gas is supplied from the inflator 110 shown in FIG. 3(a). Gas is also supplied to the front chamber 116 from the rear chamber 114 through the projecting vent 124. More specifically, a portion of the gas supplied to the rear chamber 114 flows into the front chamber 116 while causing the projecting vent 124 to inflate and deploy.

FIG. 3(c) is a diagram illustrating the process of inflation and deployment of the cushion 104 subsequent to FIG. 3(b). When inflation and deployment of the rear chamber 114 have been completed, the front chamber 116 is also filled with gas, and inflation and deployment thereof are completed following a slight delay. In this way, in the present embodiment, inflation and deployment of the front chamber 116 are completed slightly later than inflation and deployment of the rear chamber 114 due to the gas flowing into the front chamber 116 via the projecting vent 124 only.

In the side airbag apparatus 100, the rear chamber 114 located immediately beside the occupant is initially filled with gas in an efficient manner, after which the front chamber 116, which inflates and deploys over a wide area towards the front of the vehicle, is filled with gas. This configuration allows early-stage restraint of the occupant to be achieved.

As described above, the front chamber 116 is a so-called delay chamber, inflation and deployment of which are completed slightly later than in the rear chamber 114. By causing the front chamber 116 to function as a delay chamber, it is also possible to reduce the potential for harm to an occupant that is present, for example, in an unexpected (i.e. out-of-position) posture that differs from the regular seated state. For example, when an occupant is present near a vehicle outer side of the seat, the occupant is positioned at a vehicle front side of the cushion 104, such that the cushion 104 comes into contact with the occupant in a linear manner. However, as the front chamber 116 is a delay chamber, the rigidity of the front chamber 116 is slightly suppressed immediately after operation of the inflator 110, such that a load input towards the out-of-position occupant can be reduced. Further, by setting the front chamber 116 as a delay chamber, the occupant having been urged back into position due to inertia can be restrained at a more appropriate timing, particularly when the side airbag apparatus 100 is, in a side collision or the like, provided on a side opposite to the collision as viewed from the occupant (a regular far side airbag).

Figure 4:
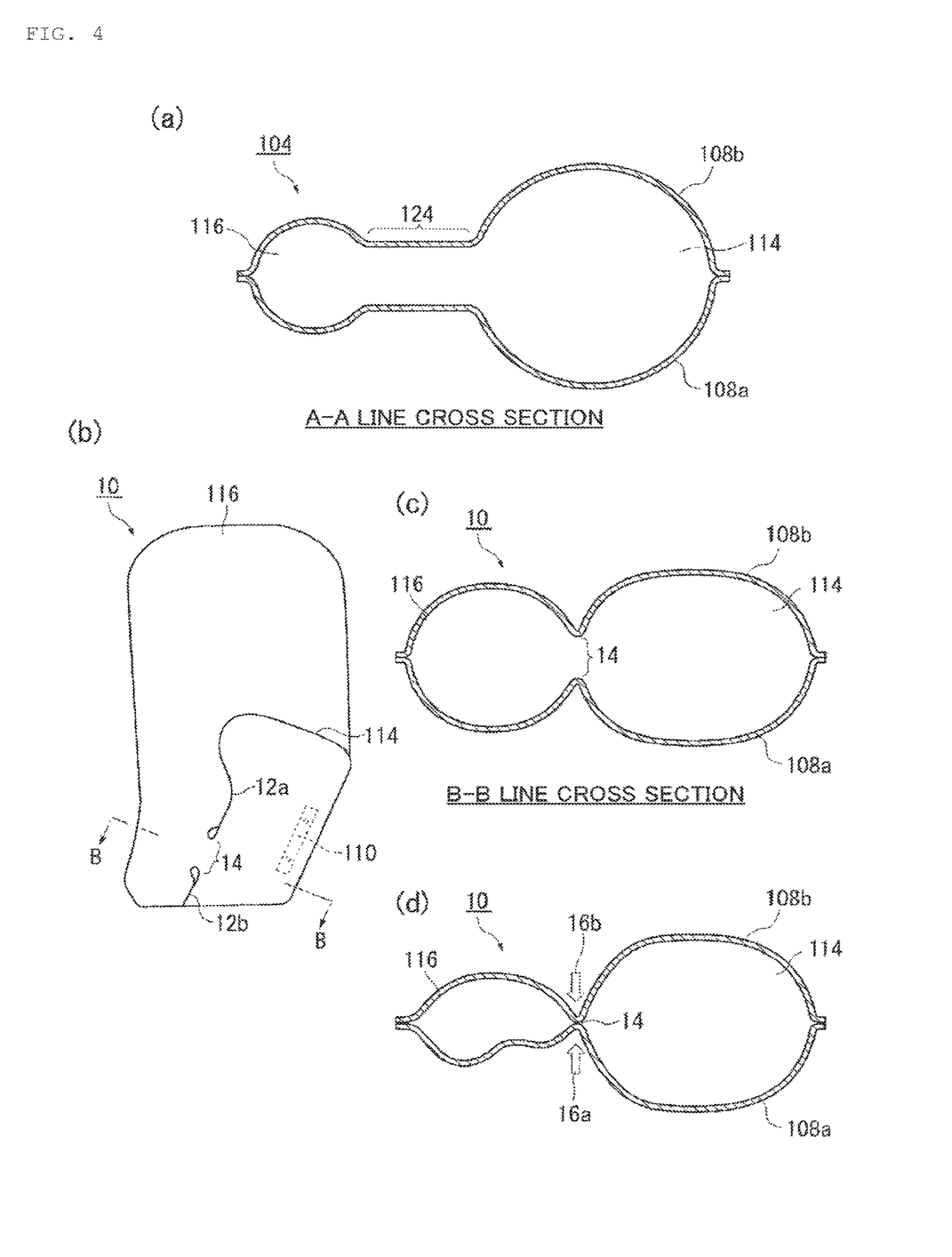

In the present embodiment, the projecting vent 124 allows a smooth flow of gas to be maintained. FIGS. 4(a) to 4(d) are diagrams comparing the cushion 104 shown in FIG. 3(c) and a cushion 10 of a comparative example. FIG. 4(a) is a cross-sectional view taken along the A-A line of the cushion 104 shown in FIG. 3(c). As illustrated in FIG. 4(a), the projecting vent 124 has a predetermined length which extends in a cylindrical shape, and a force acts thereon from an inner side thereof as gas enters, hence, once gas has entered, the projecting vent 124 does not close or collapse.

The cushion 10 illustrated in FIG. 4(b) is a comparative example of the cushion 104 shown in FIG. 3(c), in which the projecting vent 124 has been omitted. In the cushion 10, the vent portion 14 is realised by simply providing an opening (an unsewn portion) between an upper joint portion 12a and a lower joint portion 12b. FIG. 4(c) is a cross-sectional view taken along the B-B line shown in FIG. 4(b). As illustrated in FIG. 4(b), in the vent portion 14, constriction occurs in the main panels 108a and 108b of the cushion 10. This is because, as illustrated in FIG. 4(b), the main panels 108a and 108b are sewn together above and below the vent portion 14, such that there is limitation in terms of the size to which the vent portion 14 can inflate in comparison to the rear chamber 114 and the front chamber 116.

FIG. 4(c) illustrates an ideal state of inflation and deployment of the cushion 10, however, as shown in FIG. 4(d), a phenomenon in which gas flow is hindered may occur in the cushion 10. When the rear chamber 114 shown in FIG. 4(b) is inflated and deployed, for example, a force which acts in a vertical direction is applied to the rear chamber 114 by the gas. In such a case, the vent portion 14 is also pulled in the vertical direction. When this happens, areas of the main panels 108a and 108b in the vicinity of the vent portion 14 may be subjected to forces 16a and 16b, which act in a direction so as to close the vent portion 14, as illustrated in FIG. 4(d). In such a case, the vent portion 14 narrows and gas flow is hindered such that supply of gas to the front chamber 116 may be delayed.

Unlike the vent portion 14 shown in FIG. 4(d), the projecting vent 124, which has a predetermined length, illustrated in FIG. 4(a) is capable of receiving gas pressure in an efficient manner from an inner side thereof. For this reason, once gas has entered, the projecting vent 124 inflates to a cylindrical shape, and does not close or collapse thereafter. Accordingly, the cushion 104 of the present embodiment enables a smooth flow of gas, whereby rapid inflation and deployment and occupant restraint can be achieved.

FIGS. 5(a) and 5(b) and FIGS. 6(a) and 6(b) are diagrams illustrating modified examples of the cushion 104 shown in FIG. 3(c). In FIGS. 5(a) and 5(b) and FIGS. 6(a) and 6(b), previously described constituent elements are denoted by the same reference numerals, thereby eliminating description thereof. Moreover, constituent elements having the same name as a previously described constituent element embody the same function as the previously described constituent element, even where reference signs differ therebetween.

Figure 5:
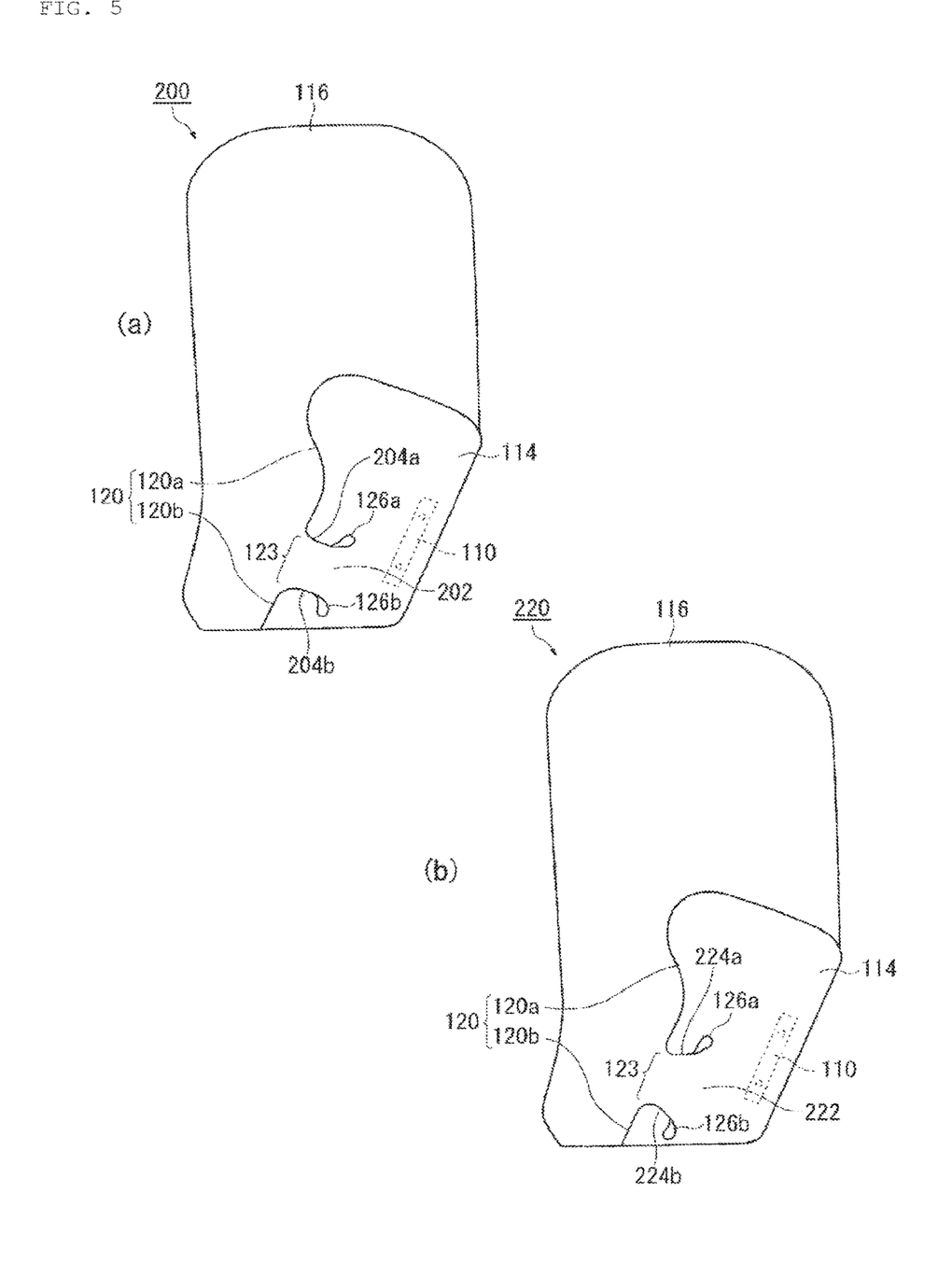

Unlike the cushion 104 shown in FIG. 3(c), a cushion 200 of the first modified example illustrated in FIG. 5(a) has a projecting vent 202 that projects so as to extend from the opening 123 to the interior of the rear chamber 114. Specifically, vent forming portions 204a and 204b, which form the projecting vent 202, extend from both ends of the opening 123 to the interior of the rear chamber 114, and the projecting vent 202 projects from a side of the front chamber 116, i.e. the second chamber of the two chambers, to a side of the rear chamber 114, i.e. the first chamber of the two chambers. The projecting vent 202 also inflates to a cylindrical shape once gas has entered, and does not close or collapse thereafter. Accordingly, the projecting vent 202 also allows gas to flow smoothly from the rear chamber 114 to the front chamber 116, which contributes to rapid inflation and deployment, etc., of the cushion 200.

A cushion 220 of a second modified example shown in FIG. 5(b) is also provided with a projecting vent 222 that projects from the front chamber 116 side to the interior of the rear chamber 114. In the cushion 220, upper and lower vent forming portions 224a and 224b, which form the projecting vent 222, are not parallel, but instead extend obliquely towards the interior of the rear chamber 114 so as to gradually separate from each other. Accordingly, the projecting vent 222 has a configuration in which a mouth serving as a gas inlet on the rear chamber 114 side is widened. With the projecting vent 222, gas can be sent towards the front chamber 116 more efficiently in comparison to the projecting vent 222 shown in FIG. 5(a).

Figure 6:
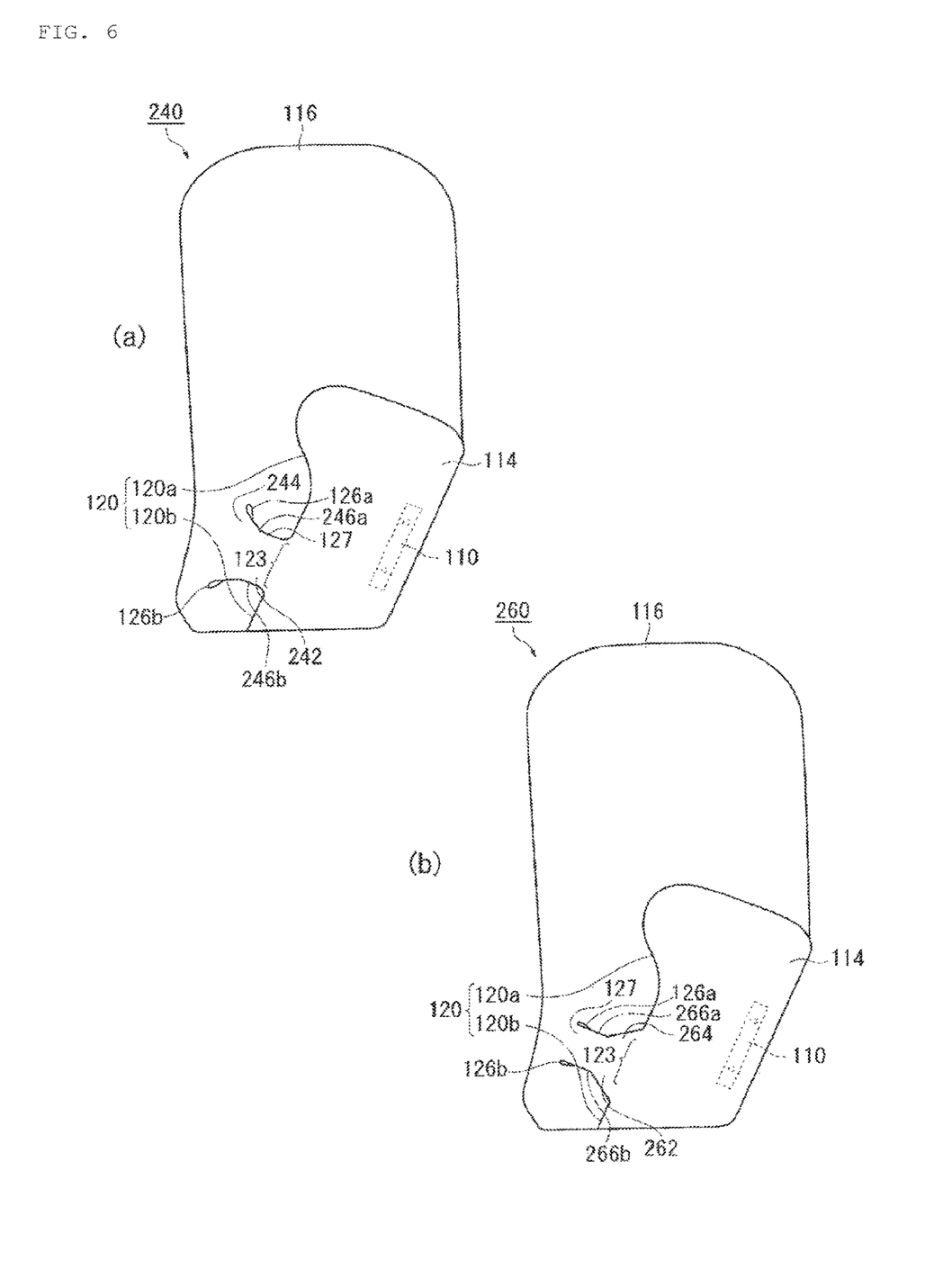

A cushion 240 of a third modified example illustrated in FIG. 6(a) is provided with a projecting vent 242 that projects so as to extend from the opening 123 to the interior of the front chamber 116. In the cushion 240, an upper vent forming portion 246a and a lower vent forming portion 246b, which are arranged in two rows and form the projecting vent 242, extend from the opening 123 to the front chamber 116 side in parallel with each other and, thereafter, extend while gradually separating from each other. As a result, the projecting vent 242 has a cylindrical portion 127 that extends in a manner such that a diameter thereof is consistent and a first conical tube portion 244 that has a shape which gradually increases in diameter, and has a shape in which a diameter thereof is larger on a distal side. The projecting vent 242 also enables gas to be sent efficiently from the rear chamber 114 towards the front chamber 116.

A cushion 260 of the third modified example illustrated in FIG. 6(a) is provided with a projecting vent 262 that projects so as to extend from the opening 123 to the interior of the front chamber 116. In the cushion 260, an upper vent forming portion 266a and a lower vent forming portion 266b, which are arranged in two rows and form the projecting vent 262, extend from the opening 123 to the front chamber 116 side while gradually getting closer to each other and, thereafter, extend in parallel with each other. As a result, the projecting vent 262 has a second conical tube portion 264 that has a shape which gradually decreases in diameter and a cylindrical portion 127 that extends in a manner such that a diameter thereof is consistent, and has a tapered shape in which a proximal side thereof has a larger diameter. The projecting vent 262 also enables gas to be sent efficiently from the rear chamber 114 towards the front chamber 116.

Note that, although implemented in a side air bag in the above description, the technical concept of the present invention can also be implemented in a curtain air bag or in a knee air bag. As the interior of a cushion for a curtain airbag is, in general, partitioned into a plurality of chambers, the base fabric joint portion 120 described above can be applied thereto so as to partition the cushion into chambers and provide the projecting vent 124 therebetween. As a cushion for a knee airbag is also, similarly to that for a side airbag, flat and has an interior that is partitioned into a plurality of chambers, the base fabric joint portion 120 and the projecting vent 124 described above can be suitably implemented therein. A smooth supply of gas, as well as rapid inflation and deployment and occupant restraint can thus be achieved with a simple configuration in any of these types of air bag apparatus in the same way as in the side airbag apparatus 100 described above.

Although the preferred embodiments of the present invention have been described above with reference to the accompanying drawings, the embodiments described above are preferred examples of the present invention, and other embodiments can also be implemented or executed by various methods. Unless specifically indicated otherwise in the description of the present application, the present invention is not limited to the shapes, sizes, configuration arrangements, etc., of the detailed components shown in the accompanying drawings. Further, the expressions and terms used in the description of the present application are for explanatory purposes and, unless specifically indicated otherwise, are not limited thereto.

While the above description constitutes the preferred embodiment of the present invention, it will be appreciated that the invention is susceptible to modification, variation and change without departing from the proper scope and fair meaning of the accompanying claims.

The invention claimed is:

1. An airbag apparatus for protecting an occupant sitting in a vehicle seat, the airbag apparatus comprising:
    an inflator which supplies a gas;
    a cushion, in which a plurality of base fabrics including at least a vehicle outer side panel and a vehicle inner side panel are formed into a bag shape, the cushion for a side airbag adapted to inflate and deploy at a side of the vehicle seat due to the gas so as to restrain the occupant during a vehicle emergency;
    a base fabric joint portion at a region which the vehicle outer side panel and the vehicle inner side panel of the cushion are joined, and which partitions the cushion into a rear chamber and a front chamber, a portion of the front chamber inflating and deploying at least on a vehicle front side of a front-most surface line of the rear chamber, and another portion of the front chamber inflating and deploying on a vehicle upper side of the rear chamber such that the front chamber deploys and covers the entire front and upper sides of the rear chamber; and
    an opening provided at about midway along the base fabric joint portion and at which the base fabrics are not joined,
    wherein the base fabric joint portion includes vent forming portions arranged in two rows which extend together from both ends of the opening towards an interior of the front chamber and forms a projecting vent that projects from the opening to the front chamber, and
    the projecting vent inflates and deploys during operation of the inflator so as to allow flow of the gas between the front and rear chambers such that inflation and deployment of the front chamber is completed later than inflation and deployment of the rear chamber due to the gas flowing into the front chamber via only the projecting vent.

2. The airbag apparatus according to claim 1, further comprising,
    the projecting vent includes a cylindrical portion in which the vent forming portions arranged in two rows extend towards the front chamber in parallel with each other.

3. The airbag apparatus according to claim 1, further comprising,
    the projecting vent includes a first conical tube portion in which the vent forming portions arranged in two rows extend towards the front chamber while gradually separating from each other.

4. The airbag apparatus according to claim 1, further comprising,
    the projecting vent includes a second conical tube portion in which the vent forming portions arranged in two rows extend towards the front chamber while gradually approaching closer to each other.

5. The airbag apparatus according to claim 1, further comprising,
    the projecting vent is formed by the vent forming portions arranged in two rows and circular joint portions.

6. The airbag apparatus according to claim 1, further comprising, the base fabric joint portion is formed by sewing.

7. The airbag apparatus according to claim 1, further comprising, the rear chamber houses the inflator.

8. The airbag apparatus according to claim 1, further comprising,
    the inflator is arranged in the rear chamber to supply the gas to the rear chamber which upon passing through the opening, inflates the front chamber.

9. An airbag apparatus for protecting an occupant sitting in a vehicle seat, the airbag apparatus comprising:
    an inflator which supplies a gas;
    a cushion, in which a plurality of base fabrics including at least a vehicle outer side panel and a vehicle inner side panel are formed into a bag shape, the cushion for a side airbag adapted to inflate and deploy at a side of the vehicle seat due to the gas so as to restrain the occupant during a vehicle emergency;
    a base fabric joint portion at a region which the vehicle outer side panel and the vehicle inner side panel of the cushion are joined, and which partitions the cushion into a rear chamber for restraining a shoulder and a chest of the occupant and a front chamber for restraining a head and an arm of the occupant, a portion of the front chamber inflating and deploying at least on a vehicle front side of a front-most surface line of the rear chamber, and another portion of the front chamber inflating and deploying on a vehicle upper side of the rear chamber such that the front chamber deploys and covers the entire front and upper sides of the rear chamber; and
    an opening provided at about midway along the base fabric joint portion and at which the base fabrics are not joined,
    wherein the base fabric joint portion includes vent forming portions arranged in two rows which extend together from both ends of the opening towards an interior of the front chamber and forms a projecting vent that projects from the opening to the front chamber, and
    the projecting vent inflates and deploys during operation of the inflator so as to allow flow of the gas between the front and rear chambers such that inflation and deployment of the front chamber is completed later than inflation and deployment of the rear chamber due to the gas flowing into the front chamber via only the projecting vent.

* * * * *